United States Patent
Byl

(10) Patent No.: US 6,668,878 B1
(45) Date of Patent: Dec. 30, 2003

(54) BRAKE ASSIST ASSEMBLY FOR AGRICULTURAL BAGGING MACHINE

(75) Inventor: John Byl, Sioux Center, IA (US)

(73) Assignee: Sioux Automation Center, Inc., Sioux Center, IA (US)

( * ) Notice: Subject to any disclaimer, the term of this patent is extended or adjusted under 35 U.S.C. 154(b) by 0 days.

(21) Appl. No.: 10/037,198

(22) Filed: Jan. 4, 2002

(51) Int. Cl.$^7$ ................................. B65B 1/04
(52) U.S. Cl. ...................... 141/73; 141/114; 141/313; 53/527
(58) Field of Search .................. 141/73, 74, 80, 141/114, 313, 317; 53/527, 567, 570, 576; 100/65–67, 148

(56) References Cited

U.S. PATENT DOCUMENTS

| | | |
|---|---|---|
| 1,662,147 A | 3/1928 | Funnel |
| 2,174,228 A | 9/1939 | Funnel |
| 2,250,910 A | 7/1941 | Hiett |
| 2,294,440 A | 9/1942 | Barker |
| 2,552,888 A | 5/1951 | Druetta |
| 3,621,775 A | 11/1971 | Dedio |
| 3,687,061 A | 8/1972 | Eggenmuller et al. |
| 3,791,593 A | 2/1974 | Griffin |
| 3,815,323 A | 6/1974 | Longo |
| 4,046,068 A | 9/1977 | Eggenmuller et al. |
| 4,102,109 A | 7/1978 | Modra et al. |
| 4,256,031 A | 3/1981 | Ryan |
| 4,308,901 A | 1/1982 | Lee |
| 4,310,036 A | 1/1982 | Rasmussen et al. |
| 4,337,805 A | 7/1982 | Johnson et al. |
| 4,412,567 A | 11/1983 | Kosters |
| 4,484,606 A | 11/1984 | Kosters |
| 4,502,378 A | 3/1985 | Cullen |
| 4,567,820 A | 2/1986 | Munsell |
| 4,572,064 A | 2/1986 | Burton |
| 4,621,666 A | 11/1986 | Ryan |
| 4,653,553 A | 3/1987 | Cox et al. |
| 4,688,480 A | 8/1987 | Ryan |
| 4,724,876 A | 2/1988 | Ryan |
| 4,788,901 A | 12/1988 | Klinner et al. |
| 4,792,031 A | 12/1988 | Warner et al. |
| 4,945,715 A | 8/1990 | Brodrecht |
| 4,949,633 A | 8/1990 | Johnson et al. |
| 5,009,062 A | 4/1991 | Urich et al. |
| 5,159,877 A | 11/1992 | Inman et al. |
| 5,269,829 A | 12/1993 | Meyer |
| 5,297,377 A | 3/1994 | Cullen |
| 5,425,220 A | 6/1995 | Cullen |
| 5,463,849 A | 11/1995 | Cullen |
| 5,464,049 A | 11/1995 | Cullen |
| 5,775,069 A | 7/1998 | Cullen |
| 5,899,247 A * | 5/1999 | Cullen .................. 141/313 |

OTHER PUBLICATIONS

Photograph of brake assist mechanism suspended from a chain.

* cited by examiner

Primary Examiner—Gene Mancene
Assistant Examiner—Peter deVore
(74) Attorney, Agent, or Firm—Daniel A. Rosenberg; Kent A. Herink; Davis,Brown,Koehn,Shors & Roberts, P.C.

(57) ABSTRACT

A bagging machine is provided that includes a frame for supporting the components of the bagging machine. The components of the bagging machine include an inlet hopper for receiving the material for compaction and moving it into the bagging machine, a compaction zone having a power compaction device located therein, wherein the compaction device conveys the material from the inlet hopper into the compaction zone, a material receptacle for receiving the material upon its exit from the compaction zone; and a brake assist mechanism assisting in, and at least partially controlling the level of, compaction of the material. The brake assist mechanism comprises a cable having a first and a second free end releasably secured to the frame such that a substantial portion of the cable lies between the compaction zone and the material receptacle, a star with a restriction plate secured to the cable, and wherein brake assist mechanism assists with the compaction of the material by resisting the movement of the material from the compaction zone into the material receptacle.

8 Claims, 6 Drawing Sheets

BRAKE ASSIST ASSEMBLY FOR AGRICULTURAL BAGGING MACHINE

BACKGROUND OF THE INVENTION

1. Filed of Invention

The invention relates generally to a brake assist assembly for use with agricultural bagging machines, and more specifically, to a brake assist assembly that enhances compaction of material during bagging by creating resistance effective in assisting the positional maintenance of a bagging machine in operation.

2. Background of the Prior Art

Agricultural bagging machines are well known in the prior art. As a substitute for large, immovable, and expensive vertical silos, horizontal agricultural bags offer many advantages for storing crop materials, and are, in effect, upright silos laid on a side. Bag filling machines, such as those disclosed in U.S. Pat. Nos. 4,412,567, and 4,484,606, are power driven and include an auger mechanism adapted to force crop material into a large bag releasably attached to the bag-filling machine. Bagging machines include a material inlet hopper, typically a conveyor of some type, and then move the input material toward the output end of the machine with a power driven auger or similar conveyance apparatus.

A large bag formed of an impervious material is attached to the output end of a bagging machine. The bag releasably affixes to the bagging machine, and includes a plurality of pleats that unfold as the bag is filled with material. The weight of the material in the bag keeps the bag in place on the ground. The bagging machine, typically mounted to a tractor, moves forward to unfurl the bag to allow for continued filling. Eventually, the bag is completely filled with crop material fed by the auger, and creates essentially a horizontal temporary storage silo.

One difficultly encountered with bagging machines comprises the ability to control the amount of compaction of the material in the bag. Variations in the density and compressibility of crop material require variability in the resistance of the bagging machine to movement during filling in order to obtain the desired amount of material compaction in the filled bag. Prior art bagging machines use some manner of manual resistance to provide the correct resistance for desired material compaction, in addition to brakes provided on the wheels of the tractor and/or on the wheels of the bagging machine.

Prior art solutions include the use of an adjustable cable, or cables, to increase or decrease the compaction within the bag. This adjustable cable is rigidly connected to the machine on one end, and is removable or disconnectable at the other end. Compaction is achieved by the increase or decrease in the cable length itself, or in the increase or decrease in the number of cables. The cable provides resistance to the free movement of material into the fill bag, which when combined with the rate of movement of the tractor and bagging machine, controls the level of compaction of the material in the fill bag. One difficulty encountered with this approach is cables, and other devices, can be very difficult to remove from the bag. With one end of the cable attached to the bagging machine, and the balance of the cable embedded in the fill bag, simply pulling the cable through the bag with the tractor and bagging machine can result in damage to the bagging machine. In those instances where the cable is even more deeply embedded in the bag, the lack of separation between the fill bag and the bagging machine makes it difficult to utilize heavier equipment to assist in removal.

Thus, a need exists for an effective braking mechanism that can be more easily removed from the fill bag.

SUMMARY OF THE INVENTION

An object of the present invention comprises providing a bagging machine having a brake assist mechanism for moving material into a material receptacle at a predetermined compaction level.

These and other objects of the present invention will become apparent to those skilled in the art upon reference to the following specification, drawings, and claims.

The present invention intends to overcome the difficulties encountered heretofore. To that end, a bagging machine is provided that includes a frame for supporting the components of the bagging machine. The components of the bagging machine include an inlet hopper for receiving the material for compaction and moving it into the bagging machine, a compaction zone having a power compaction device located therein, wherein the compaction device conveys the material from the inlet hopper into the compaction zone, a material receptacle for receiving the material upon its exit from the compaction zone; and a brake assist mechanism assisting in, and at least partially controlling the level of, compaction of the material. The brake assist mechanism comprises a cable having a first and a second free end releasably secured to the frame such that a substantial portion of the cable lies between the compaction zone and the material receptacle, a star with a restriction plate secured to the cable, and wherein brake assist mechanism assists with the compaction of the material by resisting the movement of the material from the compaction zone into the material receptacle.

DETAILED DESCRIPTION OF THE INVENTION

Figure 1:
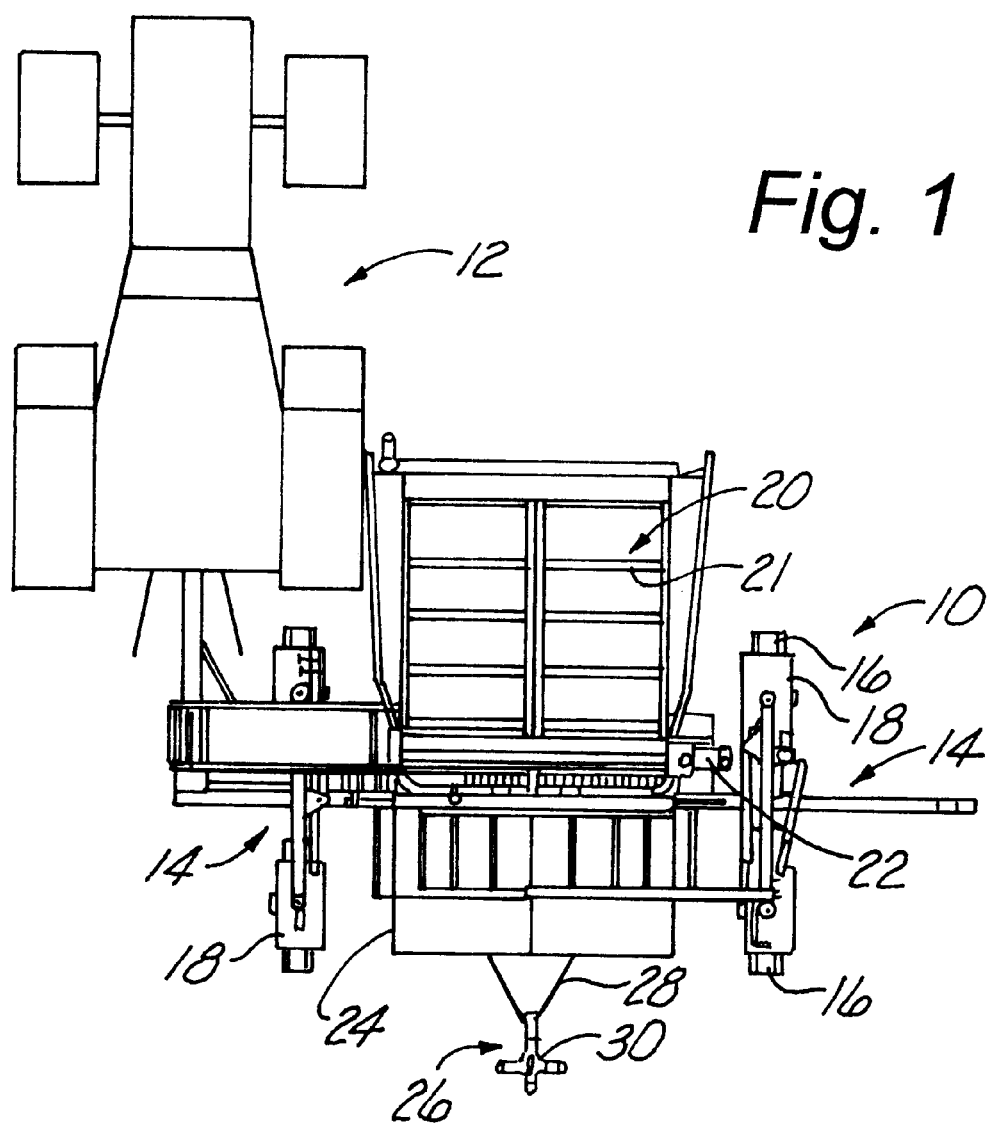
FIG. 1 is a top plan view of a tractor and bagging machine.

In the Figures, FIG. 1 shows a bagging machine 10 hitched to a tractor 12. The bagging machine 10 and tractor 12 combination depicted in FIG. 1 allows for movement of the combination during operation of the bagging machine 10, the details of which follow hereinbelow. The bagging machine 10 includes a rigid frame 14 that serves to connect and support the various components of the bagging machine 10. In particular, the frame 14 connects the four wheels 16, which can rotate between the operating position shown in FIG. 1, and the transport position shown in FIG. 2. In the storage position the bagging machine 10 hitches to the tractor 12, or any other suitable vehicle, in-line for easy transport from one location to another. In the working position shown in FIG. 1 the bagging machine 10 is offset from the tractor 12 to allow for easier access to the bagging machine 10. However, the invention is not so limited, the tractor 12 and bagging machine 10 can be configured to operate in-line.

Figure 2:
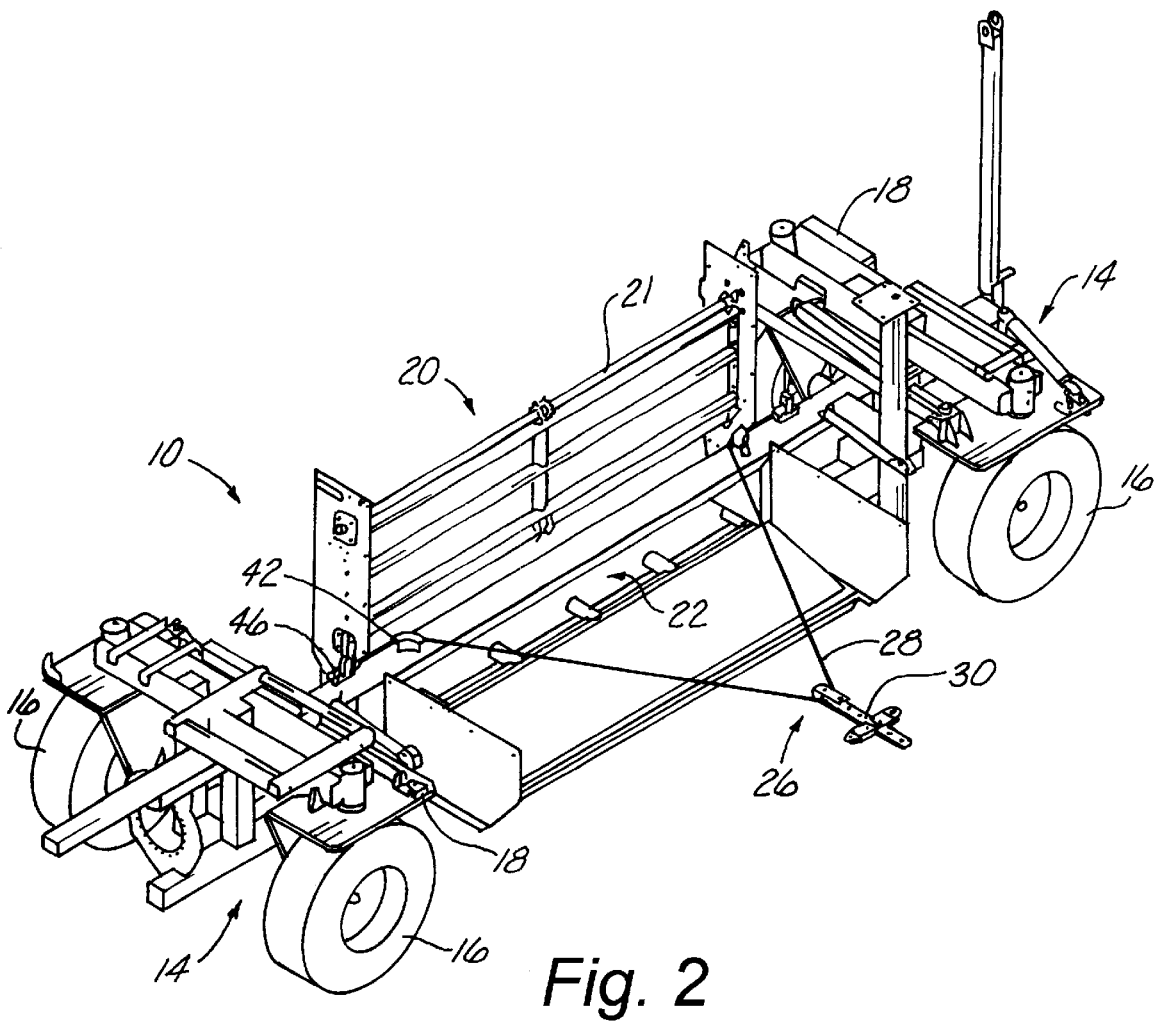
FIG. 2 is a perspective view of a bagging machine in a transport position.

The frame 14 of the bagging machine 10 also supports fender brakes 18 that engage the wheels 16 for the purpose of braking the bagging machine 10 during operation. Those of ordinary skill in the art will understand that the fender brakes 18 could be replaced with other type brakes, including, disc brakes, band brakes, and shoe brakes depending on the type and model of bagging machine 10. An inlet hopper 20 hingedly affixes to the frame 14. FIG. 1 shows the inlet hopper 20 in the working position, while FIG. 2 shows the inlet hopper 20 in the upright transport, or storage position. The inlet hopper 20 includes a plurality of rollers 21, or optionally a conveyor belt or chain and slat conveyor, for moving material into the bagging machine 10 from the inlet hopper 20.

After the material exits the inlet hopper 20 an auger or rotor 22, or similar power conveyance device, moves the material further into the bagging machine 10. The auger or rotor 22 rotates about a shaft, driven by a motor or tractor power take-off, and includes a plurality of teeth that engage the material to move it forward. A shroud 24 (see FIG. 1) surrounds and encloses the circumference of the back of the bagging machine 10. The shroud 24 creates a frame for supporting a material receptacle, or bag, that receives the material output of the bagging machine 10. The material receptacle consists of a large impervious pleated enclosure that engages the outside of the shroud 24, and unfurls upon operation of the bagging machine 10 that drives the material into the material receptacle. The area generally defined by the interior of the shroud defines a compaction zone, wherein the operation of the bagging machine 10 compacts the material to a predetermined density in the compaction zone.

Figure 3:
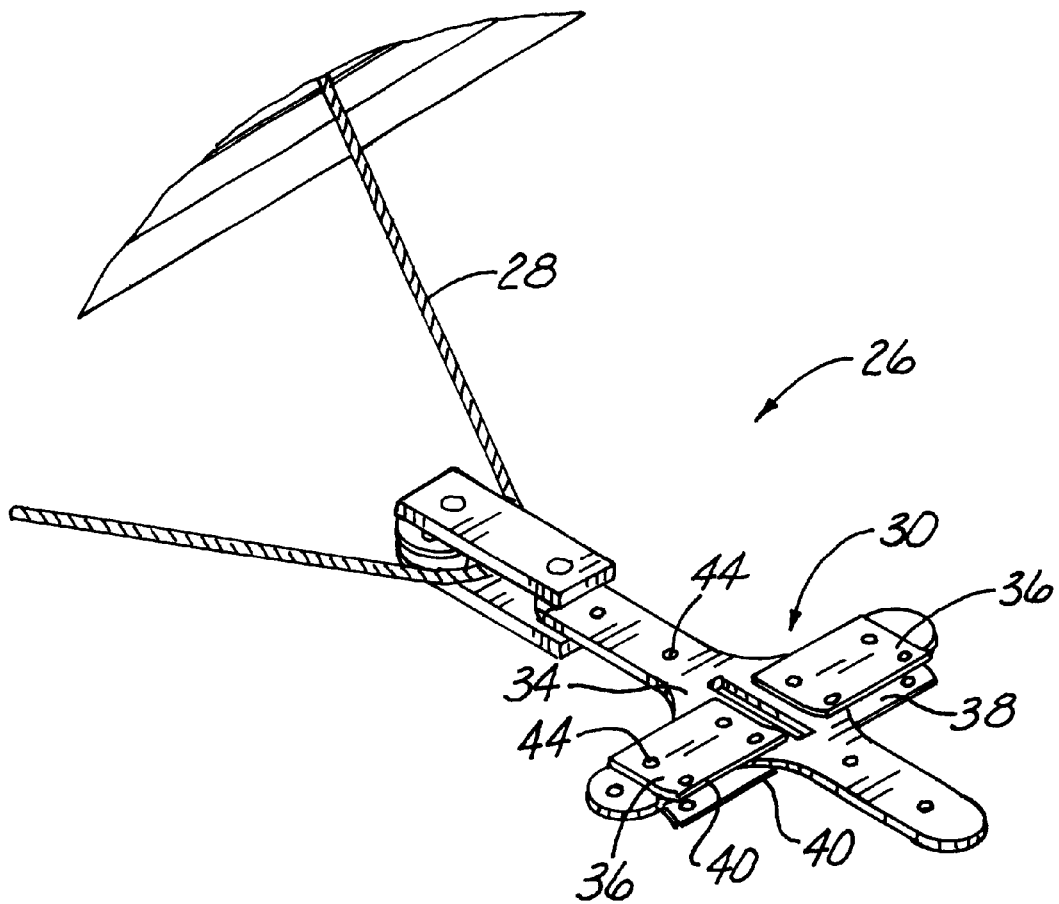
FIG. 3 is a partial view of a brake assist mechanism of the bagging machine.

In addition, a brake assist mechanism 26 lies at least partially within the general area of the compaction zone. The brake assist mechanism 26 includes a cable 28 with free ends secured to quick release devices 46 (see FIG. 2). Additionally, the cable 28 passes through cable guide supports 42 secured to the frame 14. As shown in FIG. 3, a star 30 is affixed to the cable 28 and is secured to a star body 34. The star body 34 includes holes 44 through which restrictor plates (upper and lower) 36, 38 attach to the star body 34 through aligned holes 44. The restrictor plates 36, 38 include a curved edge 40 that depending on the orientation of the restrictor plates 36, 38 adjust the amount of restriction applied to the material by the brake assist mechanism 26. By securing the restrictor plates 36, 38 to the star body 34 in the orientation shown in FIG. 3, the restrictor plates 36, 38 present a minimal profile, and the brake assist mechanism 26 applies a minimal amount of restriction to the material passing thereby. This reduces the amount of compaction in the compaction zone, and in the material receptacle. Reversing the orientation of one or more of the restrictor plates 36, 38, such that the plate(s) 36, 38 attach to the star body 34 through the holes 44 adjacent to the curved edge 40 of the plate(s) 36, 38, will increase the amount of resistance presented by the brake assist mechanism 26. The brake assist mechanism 26 is designed to provide up to fifty percent of the desired resistance.

Figure 4:
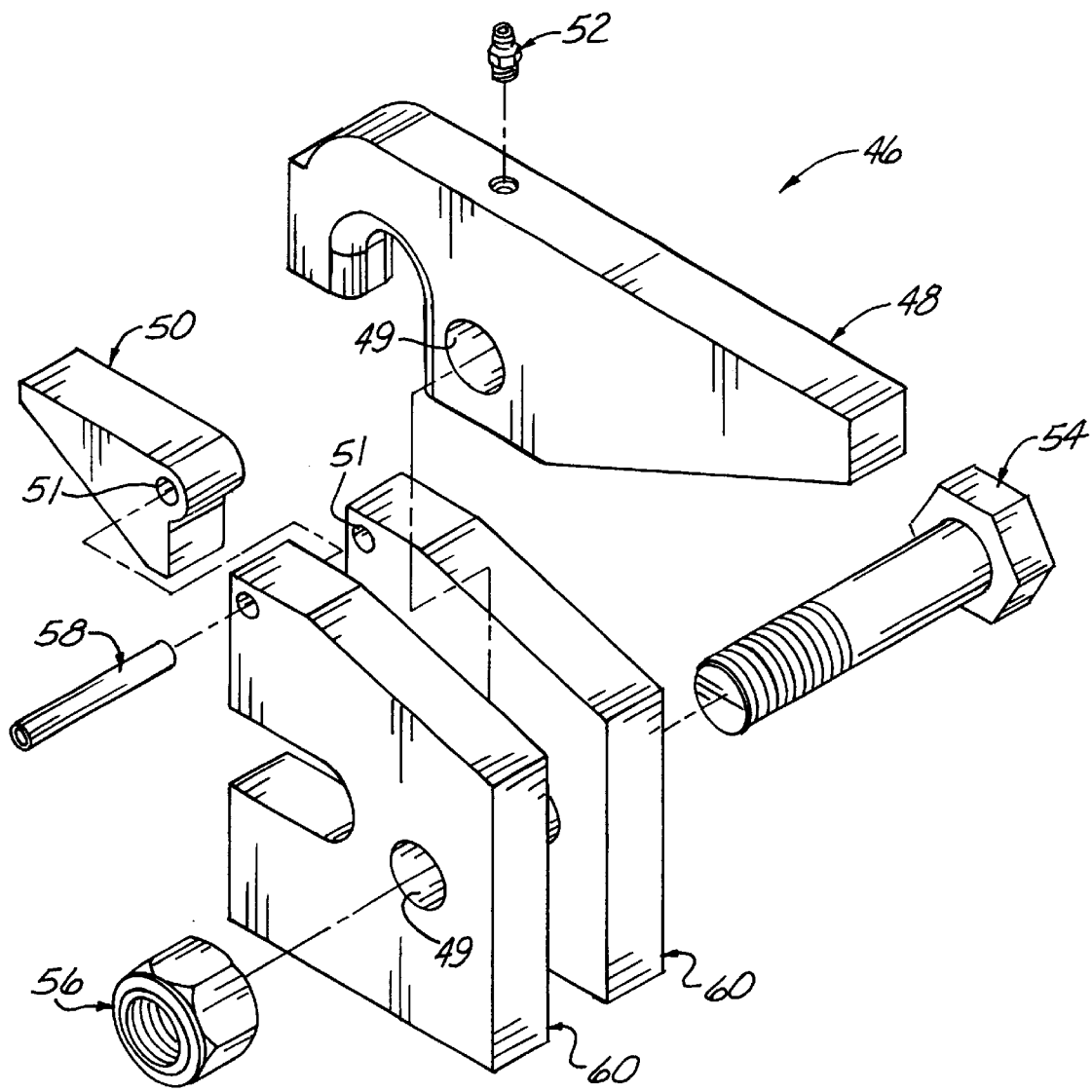
FIG. 4 is an exploded perspective view of a quick-release device of the brake assist mechanism.

The identical quick-release devices 46 secure both of the free ends of the cable 28 to the frame 14. FIG. 4 shows an exploded perspective view of the components of the quick-release device 36. The quick-release device 46 includes a latch lever 48 having a tapered end and a curved beveled end opposite thereto. The latch lever 48 is inserted between the two quick-release body members 60. The latch lever 48 includes a hole 49 that aligns with holes 49 in the quick-release body members 60. Thus aligned, a bolt 54 and lock nut 56 secure the latch lever 48 and the quick-release body members 60 to each other. The quick-release device 46 includes a latch lock 50 that is formed to meet in mating alignment with the curved beveled end of the latch lever 48 on one end. The latch lock includes a tapered end opposite thereto. The latch lever 48 is secured to the quick-release body members 60 with a pin 58 through aligned holes 51 in the latch lever 48, and in the quick-release body members 60. Finally, the quick-release device 46 includes a channel 53 in the latch lever 48 to allow for introduction of grease to facilitate smooth movement of the latch lever 48 between the closed and open positions. A cap 52 covers the channel 53.

Figure 5:
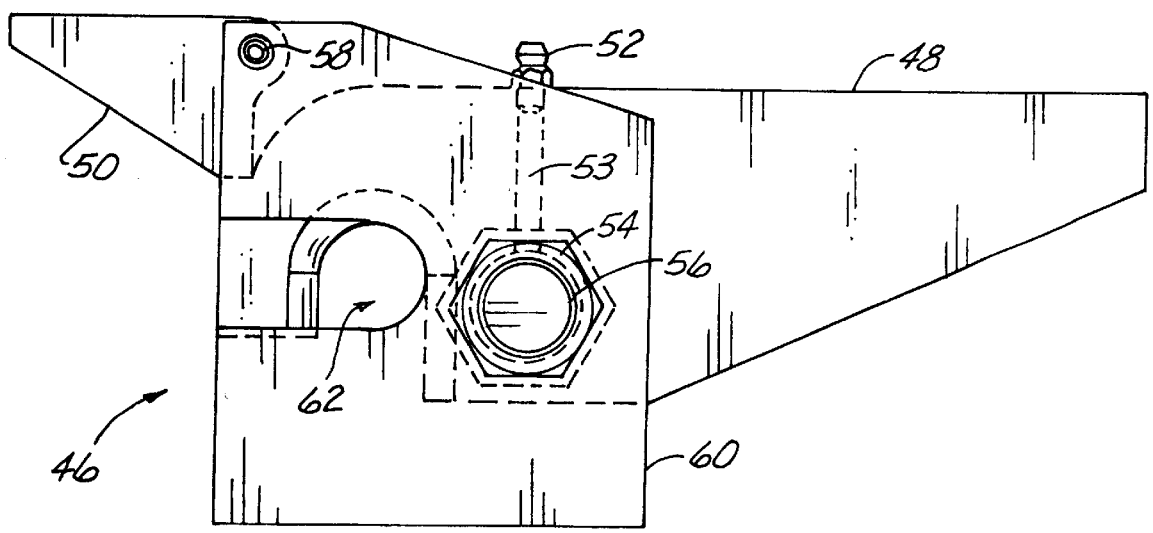
FIG. 5 is a side view of the quick-release device in the closed/latched position.
Figure 6:
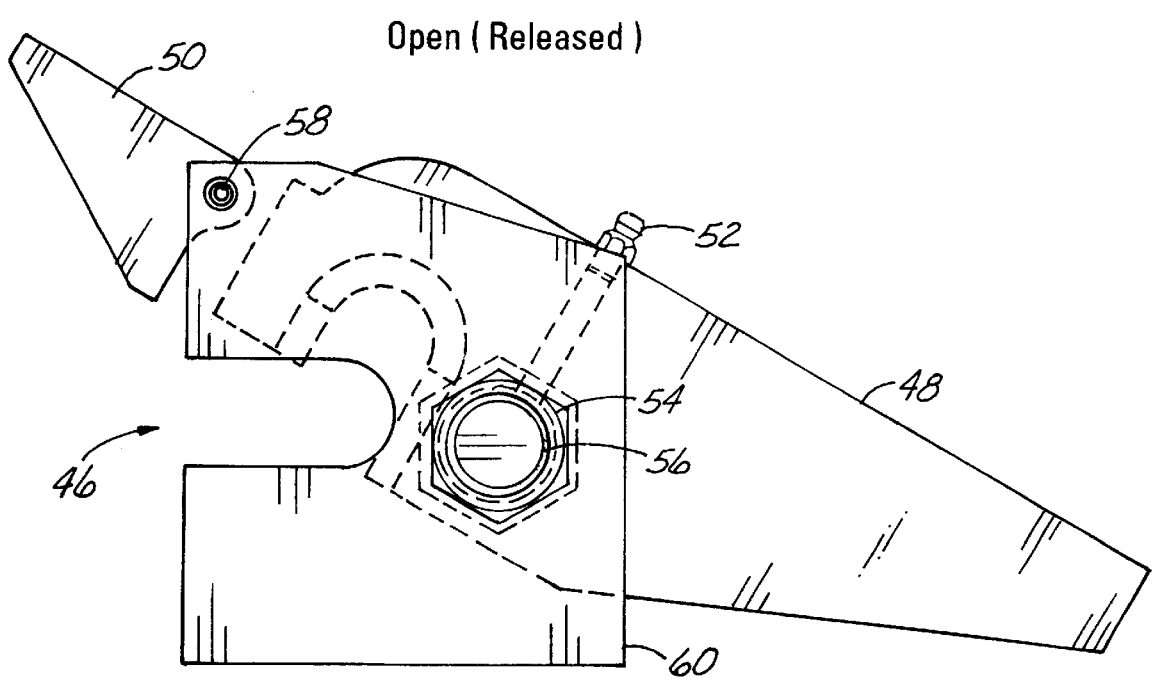
FIG. 6 is a side view of the quick-release device in the open/released position.

In operation, the ends of the cable 28 include hooks that secure to the slot 62 formed between the rounded end of the latch lever 48 and a channel in the quick-release body members 60, when these components orient in the manner shown in FIG. 5. FIG. 5 shows the quick-release device 46 in the closed position. In this position the latch lock 50 holds the latch lever 48 in place, thereby forming the slot 62 for retaining the ends of the cable 28. FIG. 6 shows the quick-release device 46 in the open position. Moving the tapered end of the latch lock 50 upward releases the latch lever 48. Moving the tapered end of the latch lever 48 downward clears the slot 62 to allow for freely removing the ends of the cable 28.

The following describes the operation of the bagging machine 10, and in particular the operation of the brake assist mechanism 26. With the bagging machine 10 and tractor 12 in the orientation shown in FIG. 1, and with the ends of the cable 28 secured in the quick-release devices 46, operation can commence. The material receptacle is placed around the shroud 24, and material is feed into the inlet hopper 20. The auger or rotor 22 further conveys the material into the compaction zone, where it begins to collect and compact under the restriction provided by the break assist mechanism. The material will collect in the receptacle and the force of the material in the receptacle will overcome the resistance of the bagging machine 10 and/or any tractor 12 brakes, along with the resistance of the brake assists mechanism 26, and which point the bagging machine and tractor will begin to move forward unfurling the material receptacle. The resistance offered by the combination of the bagging machine 10, brakes 18, and/or tractor 12 brakes, and the brake assist mechanism 26 will determine the compaction level of the material in the material receptacle. Varying the amount of the resistance provided by any of these components will cause a corresponding change to the compaction of the material in the receptacle. The actual amount of resistance will also vary depending on the material involved, as well as depend on the desired compaction level.

Once the material receptacle is filled to the desired level, the material receptacle is removed from around the shroud 24. The brake assist mechanism 26 is released from the bagging machine 10 by opening the quick-release devices 46. The bagging machine 10 can then be moved away from the material receptacle to allow for removal of the brake assist mechanism 26 from the receptacle. The free end of the cable 28 can be attached to a tractor, or other similar apparatus, and the brake assist mechanism 26 can be pulled from the receptacle. In this manner, the brake assist mechanism 26 substantially eliminates the problems associated with removing prior art devices, while still providing the ability to easily adjust and vary the amount of resistance thereby controlling the compaction level of the material in the material receptacle.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A quick release mechanism for use with a brake assist mechanism of an agricultural bagging machine, comprising:
   an agricultural bagging machine having an inlet hopper for the introduction of material to be bagged, a powered conveyance means for moving the material the material from the inlet hopper to a tunnel, wherein the tunnel comprises a front wall and top, bottom, and side enclosures;
   a brake assist assembly secured to the agricultural bagging machine with a cable;
   a quick release mechanism secured to the agricultural bagging machine for releasably securing an end of the cable, wherein the quick release mechanism moves between a closed position where the end of the cable is secured and an open position where the end of the cable is released.

2. The invention in accordance with claim 1 where the cable passes through the front wall of the tunnel.

3. The invention in accordance with claim 1 further comprising two quick release mechanisms for securing two ends of the cable.

4. The invention in accordance with claim 1 wherein the quick release mechanism comprises a latch lever secured between two body members secured with a pivot bolt, and the latch lever pivots about the bolt as the quick release mechanism moves between the open and closed position.

5. The invention in accordance with claim 4 wherein the quick release mechanism further comprises a latch lock secured to the body members and that pivots between a locked position where the latch lock locks the latch lever when the quick release mechanism is in the closed position, and an unlocked position where the latch lever is released with the quick release mechanism is in the open position.

6. The invention in accordance with claim 1 wherein the agricultural bagging machine further comprises a frame for supporting the components of the machine, and the quick release mechanism is secured to the frame.

7. The invention in accordance with claim 1 wherein the quick release mechanism is located outside the tunnel.

8. A quick release mechanism for use with a brake assist mechanism of an agricultural bagging machine, comprising:
   an agricultural bagging machine having an inlet hopper for the introduction of material to be bagged, a powered conveyance means for moving the material the material from the inlet hopper to a tunnel, wherein the tunnel comprises a front wall and top, bottom, and side enclosures;
   a brake assist mechanism secured to the agricultural bagging machine with a cable passing through the front wall of the tunnel;
   a quick release mechanism secured to the agricultural bagging machine for releasable securing an end of the cable.

* * * * *